Nov. 11, 1941.    J. L. FOREMAN    2,262,579
PORTABLE SIGN
Filed July 21, 1939    2 Sheets-Sheet 1

INVENTOR
Jules L. Foreman
BY
ATTORNEY

Nov. 11, 1941.   J. L. FOREMAN   2,262,579
PORTABLE SIGN
Filed July 21, 1939   2 Sheets-Sheet 2
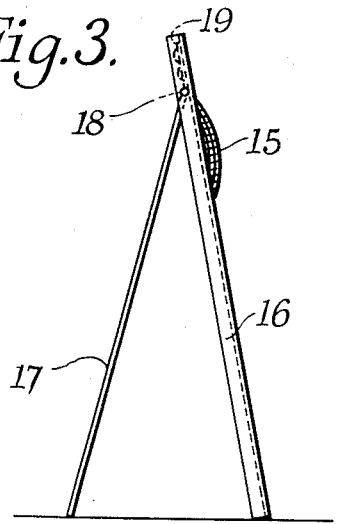
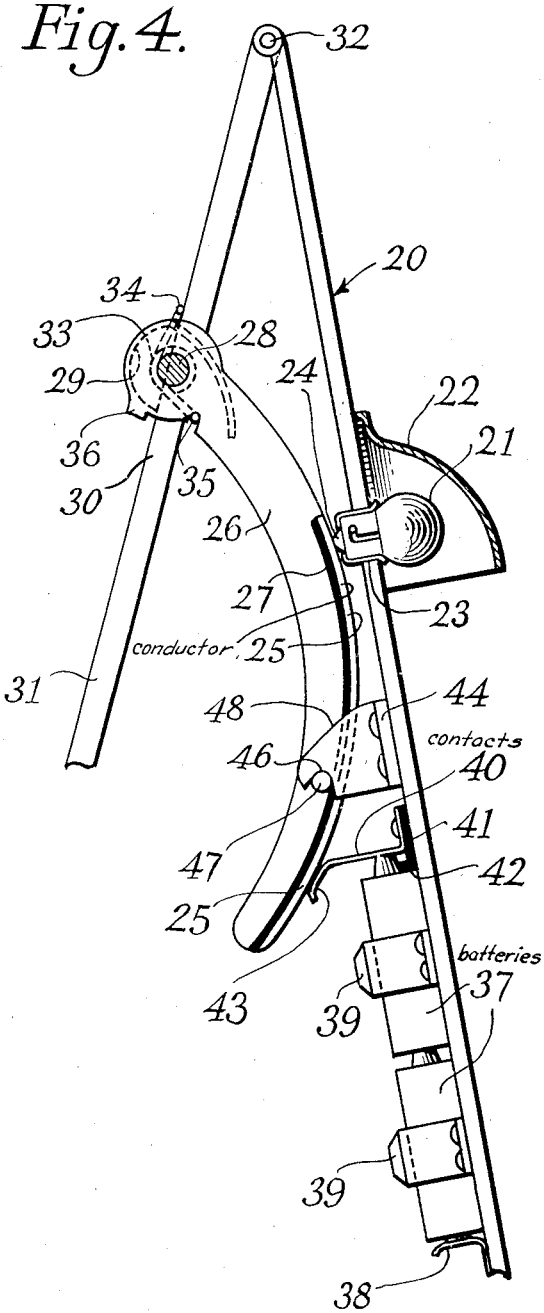
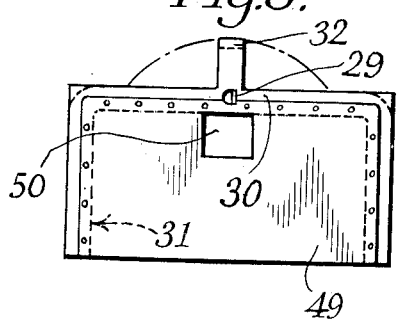
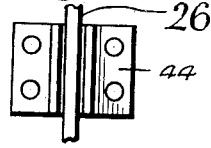
INVENTOR
Jules L. Foreman
BY
ATTORNEY Patented Nov. 11, 1941

2,262,579

UNITED STATES PATENT OFFICE 2,262,579

PORTABLE SIGN

Jules L. Foreman, New York, N. Y.

Application July 21, 1939, Serial No. 285,686

5 Claims. (Cl. 177—324)

My invention relates to signs, and more particularly to portable signs especially adapted to be carried by motor vehicles and used in the event of disablement to warn approaching vehicles of the presence of the road obstruction that may result.

Not infrequently motor vehicles become disabled in positions where they cannot be seen by approaching drivers even during daylight hours, as for example, in narrow defiles beyond turns, where the limited width of the road or character of the terrain prevents prompt removal of the disabled vehicle from the highway. A grave collision hazard to both on-coming and disabled vehicle necessarily results and the danger is greatly augmented during times of darkness or fog. The inadequacy of conventional tail lights under such circumstances will be readily understood. Indeed the tail lights are quite incapable of being relied upon under such circumstances regardless of their power or excellence because they are subject to both mechanical and electrical failure and are not uncommonly included in the break-down of other constituent parts of the mechanism.

It accordingly is one object of the invention to provide a sign of the character described which shall be economical of manufacture, compact, readily portable, and such as will vividly arrest the attention of approaching drivers of motor vehicles.

Yet another object of the invention resides in the provision of a safety device adapted to be carried by motor vehicles and to be mounted on the road as a warning to approaching vehicles in the event of a break-down or other disablement which necessitates stopping at a point where the line of vision between approaching drivers and the stopped vehicle may be obstructed.

Still another object of the invention consists in providing a device of the character described in which a self-contained source of electrical energy is utilized to illuminate a warning notice or other indicia.

It is a further object of the invention to automatically connect and disconnect a self-contained source of electrical energy with an electric light bulb capable of illuminating a warning sign as an incident mounting the device for use, collapsing it for storage, respectively.

Other objects and advantages will be apparent in the following description taken in conjunction with the accompanying drawings, in which:

Figure 3 is an end elevation of one form of the device in effective safeguarding position.

Figure 4 is an enlarged fragmentary end elevation of part of the structure shown in Figure 2.

Figure 5 is a rear elevational view of the device shown in Figure 4.

Figure 6 is an enlarged elevation of a detail of the construction shown in Figure 4.

Figure 1:
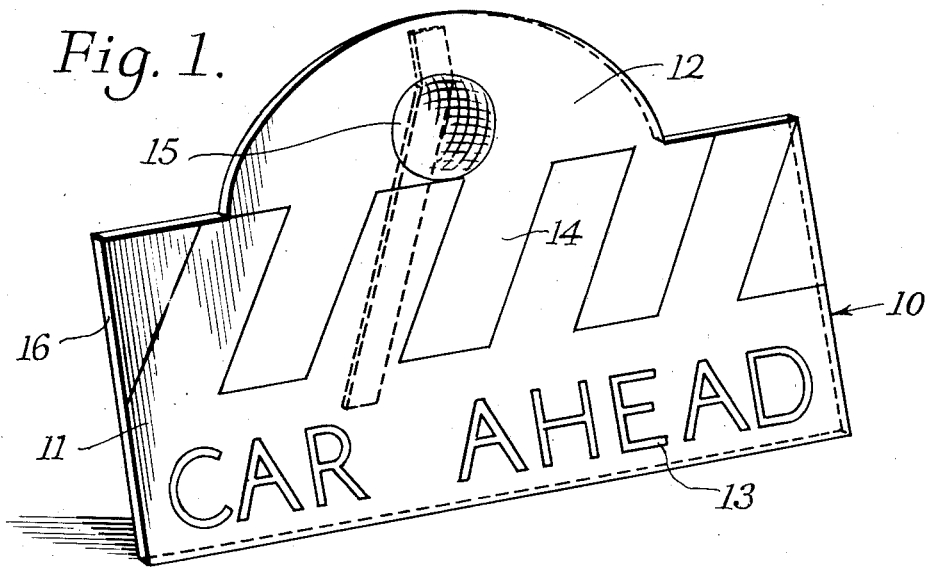
Figure 1 is a perspective view of one embodiment of the invention.

Referring now to Figure 1, a portable sign embodying a preferred form of the invention is indicated generally by the numeral 10. The sign comprises, in this instance, a rectangular body portion 11, surmounted by a circular or elliptical decorative top 12. It will be understood of course that the sign comprising my invention may assume any desired contour or size without departing from the spirit of the invention.

On the face of the sign I prefer to inscribe suitable symbols or indicia indicating danger, as for example, the expression "Car ahead" as indicated at 13. The warning indicia is preferably inscribed upon a contrasting background, the upper portion of which is further vivified by the presence of a series of angularly disposed colored stripes 14 and 14', such as the red and white stripes commonly associated with railroad crossing warning signs.

Surmounting the stripes 14 is a circular light-reflecting element 15 which may comprise one or a plurality of reflecting surfaces such that the light from the head lamps of a motor vehicle will cause it to produce an illuminating effect practically regardless of the angularity of the sign with respect to the line of the light beam from the head lamps.

The sign may be reinforced, as for example, by turning ts peripheral edges at substantially a right angle to the plane of the surface of the sign as shown at 16 in Figures 1 and 3 or, if desired, a light angle bar may be welded or otherwise secured to the peripheral edge of the body of the sign.

The sign is adapted to be maintained in an upright position on the road by means of a leg or arm 17 pivoted at 18 to the rear surface of the sign, a short section 19 of the same material as the leg 17 being fixed to the body of the sign to prevent distortion thereof as an incident to movement of the supporting leg to and from an effective position. As will be apparent in Figure 3, the supporting leg 17 is adapted to be moved into parallel relation with respect to the face of the sign when the latter is not in use and in this position the reinforcing edge or channel 16 functions to completely house the leg 17. Thus the device can be conveniently stored in a motor vehicle without utilizing an objectionably large space.

Figure 2:
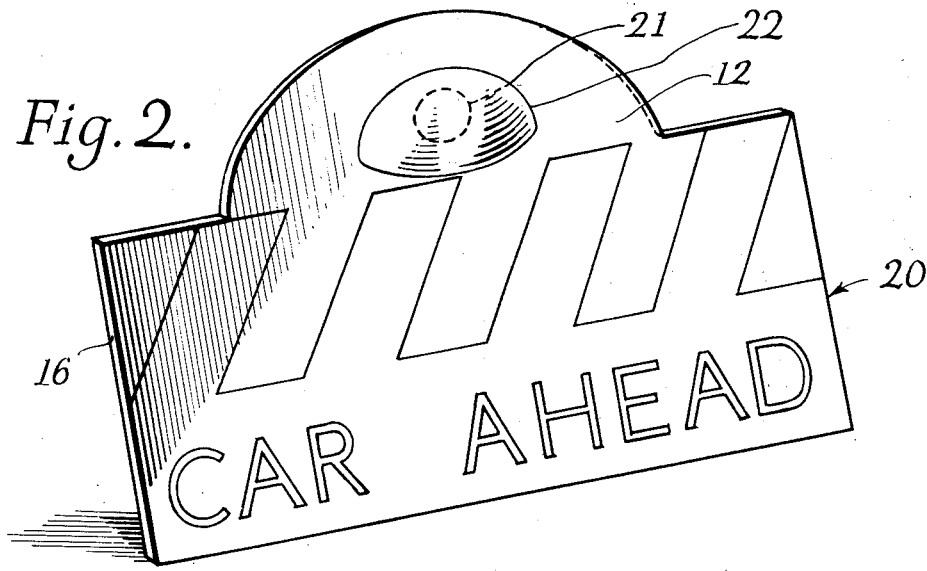
Figure 2 is a perspective view of an alternative embodiment of the invention.

In Figures 2, 4, 5 and 6, I have disclosed an alternative embodiment of the invention. Referring particularly to Figure 2, the face of the sign constituting the alternative construction as shown at 20, is generally similar to the sign 10. In this instance, however, I utilize an electric light bulb 21 surmounting the body of the sign, a shield 22 serving to direct the light downwardly across the length of the warning indicia as well as to safeguard the bulb against breakage.

As shown in Figure 4, the lamp 21 may be a typical automobile head lamp arranged to be removably received in any standard bayonet type socket. Such a socket as shown at 23 is snugly received in an aperture formed in the body of the sign so as to establish an electric contact therewith. As is customary, the socket 23 is provided with an inwardly turned apertured bottom through which the central terminal 24 of the lamp projects. Terminal 24 of lamp 21 is adapted to ride upon a continuous conductor 25 which is insulated from the body of an arm 26 by a strip of insulating material 27.

Arm 26 is pivoted at 28 to an upstanding lug 29 struck from the body portion 30 of a bifurcated leg or support 31. As shown in Figure 5, the bifurcated support 31 is pivoted adjacent the upper edge of the sign by a hinge 32 adapted to permit substantially 360° of rotation of the support with respect to the body of the sign.

Referring now to Figure 4, a coiled spring 33 is wound about the pin which functions as the pivot for arm 26, one end of the spring being turned laterally at 34 to engage the surface of support 31, the second end of the spring being turned laterally at 35 to bear against the under edge of arm 26. This spring 33 operates to urge arm 26 in a counter-clockwise direction as viewed in Figure 4, the movement being limited, however, by a lug 36 struck laterally from the face of the arm to engage the edge of support 31 as is shown in the drawing.

A source of electrical energy in the form of one or more dry cell batteries is supported on the rear face of the sign, as shown at 37, in this instance two such batteries being employed. A metallic base support 38 fixed to the body of the sign in conjunction with laterally opening spring clips 39 serves to removably maintain the batteries 37 in position. The central terminal of the upper one of the batteries 37 bears against a spring contact strip 40 fixed to and insulated from the body of the sign by a strip of insulating material 41, the lower edge of which latter material is turned rearwardly at 42 to define the upper limiting position of the topmost one of the batteries.

As shown particularly in Figure 4, the rearwardly projecting end of contact strip 40 is turned downwardly at 43 to form a yieldable contact finger which wipes against the conductor 25.

Hence it will be seen that a circuit is established from the common central terminals of the batteries through strip 40, conductor 25 and central terminal 24 of lamp 21 to the socket 23 and thence back to the batteries through the body of the sign by way of the metallic base support 38. Furthermore, it will be noted that spring 33 will tend to rotate arm 26 against the relatively weak spring strip 43 until a contact is established between the conductor 25 and the central terminal 24 of the lamp.

I utilize arm 26 as a means of limiting the outward movement of supporting leg 31 when the device is in use as well as to simultaneously maintain the lamp and contact strip 40 in electrical circuit with conductor 25. To this former end an angle bracket 44 including a pair of spaced similar rearwardly projecting arms 45 is rigidly fixed to the body of the sign. As shown in Figure 4, the lower edge of one of the arms 45 is notched at 46 to receive a pin 47 secured to the arm 26. Furthermore, the upper edges of arms 45 are curved downwardly and rearwardly to define a camming edge 48 which terminates in the notch 46.

Referring now to Figure 5, I have shown a plate 49 bridging the legs of support 31, an aperture being formed in the plate adjacent the horizontal section 30 of the support.

When the device is not in use the support 31 is rotated to a position in which it overlies the face of the sign, thus protecting the latter from breakage when not in use. It will be seen that the aperture 50 in plate 49 permits the lamp house 22 to project therethrough when the sign is in condition for storage.

When it is desired to use my alternative construction, the support is rotated approximately to the position shown in Figure 4, whereupon pin 47 on arm 26 will engage the camming edge 48 of bracket 45 and ride downwardly and then forwardly until it engages the notch 46 in the bracket. Thus a circuit will be automatically established to the lamp 21 and the relationship of pin 47 and notch 46 will prevent the sign support from again being restored to inoperative position until the latter is moved slightly toward the body of the sign and pin 47 disengaged from bracket 44.

I claim as my invention:

1. A portable sign of the character described, comprising in combination, a body portion having warning indicia on the front surface thereof, an electric light bulb effective to illuminate said indicia, a support pivotally connected to the rear surface of said body portion, said support being swingable from a collapsed to a sign supporting position, an arm pivotally mounted on said support, yieldable means acting to urge said arm toward said body portion, a source of electrical energy carried on said body portion and an electrical conductor on said arm effective to establish a circuit from said lamp to said source of electrical energy when said support is moved to position to maintain said sign in vertical position.

2. A portable sign of the character described, comprising in combination, a body portion having warning indicia on the front surface thereof, an electric light bulb effective to illuminate said indicia, a support pivotally connected to the rear surface of said body portion, said support being swingable from a collapsed position adjacent the front surface of said body portion to a sign supporting position angularly disposed to the rear surface of said body portion, a source of electrical energy on said body portion and means carried by said support to establish a circuit from said source of electrical energy to said lamp and to maintain said support in sign supporting position.

3. A portable sign of the character described, comprising in combination, a body portion having warning indicia on the front surface thereof, an electric light bulb effective to illuminate said indicia, a support pivotally connected to the rear surface of said body portion, said support being swingable from a collapsed position adjacent the front surface of said body portion to a sign supporting position angularly disposed to the rear surface of said body position, a source of electrical energy on said body portion, a pivotal arm carried on said support, yieldable means tending to rotate said arm, an electrical conductor carried by but insulated from said arm, and means on said body arranged to be engaged by said arm to maintain said support in sign supporting position and to maintain an electrical circuit from said source of electrical energy through said conductor to said lamp.

4. A sign of the character described, comprising in combination, a body and a support pivoted thereto, said support being swingable from a collapsed position protecting the front of said body to an angular position with respect to the rear of said body, a spring actuated arm automatically operable to lock said support in said last mentioned position, a light bulb to illuminate the front of said body and a battery carried on said body, said arm being effective to establish a circuit between said battery and bulb as an incident to latching said support.

5. A portable sign of the character described and comprising in combination, an electrical conducting body portion having warning indicia on the front surface thereof, an electric light bulb electrically connected to and effective to illuminate said indicia, a support pivotally connected to the rear surface of said body portion, said support being swingable from a collapsed to a sign supporting position to establish an electrical circuit relationship with said body, a source of electrical energy carried on said body portion and having one terminal electrically connected thereto and means including a swingable contact arranged to be actuated by said support as an incident to movement to sign supporting position to complete an electrical circuit from said source of electrical energy through said body to said bulb.

JULES L. FOREMAN.